United States Patent
White et al.

(10) Patent No.: US 6,800,004 B1
(45) Date of Patent: Oct. 5, 2004

(54) MARINE EXHAUST COOLING SYSTEM

(75) Inventors: Brian R. White, Stillwater, OK (US); Vince E. Notareschi, Stillwater, OK (US); John A. Voit, Stillwater, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/612,503

(22) Filed: Jul. 2, 2003

(51) Int. Cl.[7] ............................................. B63H 21/10
(52) U.S. Cl. .................... 440/88 J; 440/89 C
(58) Field of Search ..................... 440/88 C, 88 G, 440/88 J, 88 M, 89 B, 89 C, 89 G

(56) References Cited

U.S. PATENT DOCUMENTS

| | | | |
|---|---|---|---|
| 4,179,884 A | * 12/1979 | Koeslin | 60/321 |
| 4,831,822 A | 5/1989 | Yoshimura | 60/310 |
| 4,991,546 A | * 2/1991 | Yoshimura | 123/41.31 |
| 5,421,756 A | 6/1995 | Hayasaka | 440/89 |
| 5,980,343 A | 11/1999 | Rolinski | 440/89 |
| 6,290,558 B1 | 9/2001 | Erickson | 440/89 |
| 6,406,344 B1 | * 6/2002 | Bland et al. | 440/88 R |
| 6,644,024 B1 | * 11/2003 | Powers et al. | 60/320 |

* cited by examiner

*Primary Examiner*—Stephen Avila
(74) *Attorney, Agent, or Firm*—William D. Lanyi

(57) ABSTRACT

An exhaust system for a marine engine uses an orifice to distribute liquid coolant flow between two alternative and parallel paths. One coolant path passes through a generally horizontal portion of an exhaust elbow and the other coolant path passes through the orifice and directly to a vertical riser of the exhaust elbow. The ratio of flow between the two paths changes as a function of engine speed because of the operation of the orifice which provides increased resistance to flow as a function of increased pressure drop across the orifice. Although coolant liquid continues to flow through both paths at all times, the relative magnitudes of the two parallel flows are changed in response to changes in the coolant flow into the elbow which, in turn, changes as a function of engine speed.

18 Claims, 4 Drawing Sheets

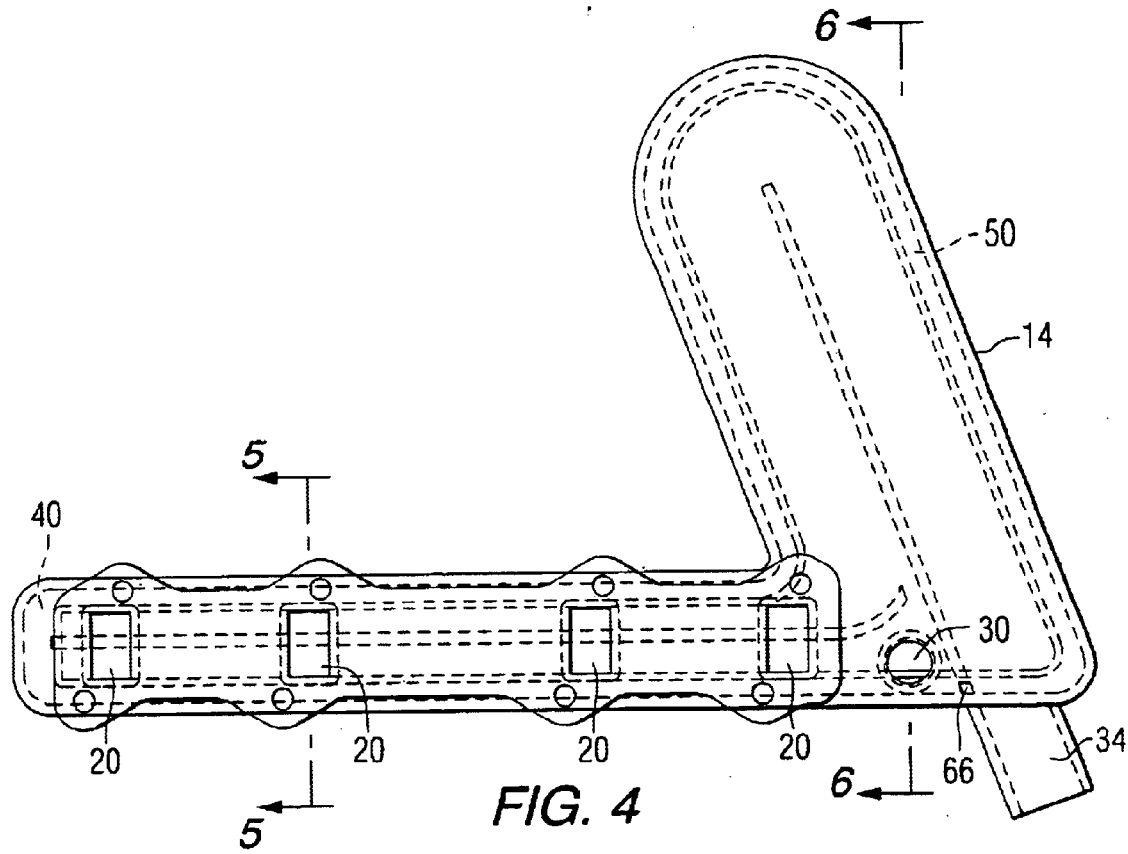
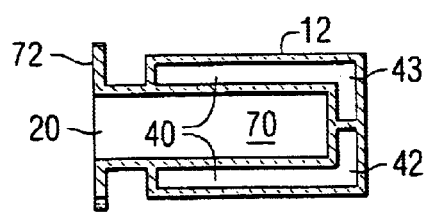
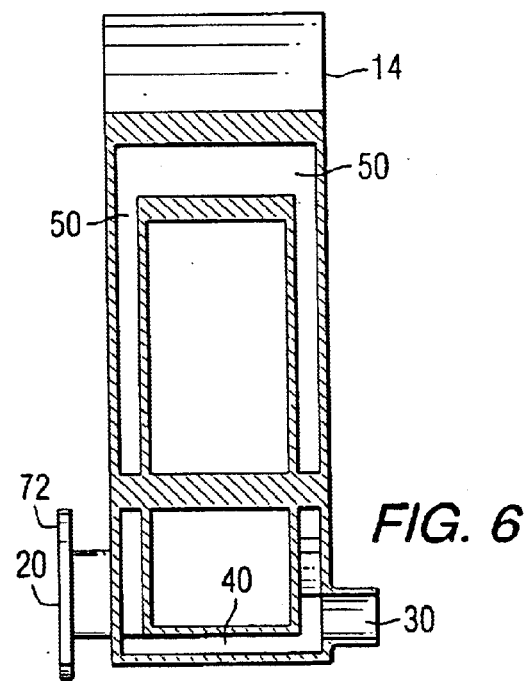

MARINE EXHAUST COOLING SYSTEM

BACKGROUND OF THE INVENTION

1. Field of the Invention

The present invention generally relates to an exhaust cooling system for a marine engine and, more particularly, to a simplified system that provides cooling of exhaust gasses at a rate which is determined as a function of the operating speed of the engine.

2. Description of the Prior Art

Exhaust systems for marine propulsion devices, such as sterndrive systems, are well known to those skilled in the art. Exhaust gasses are conducted through an exhaust elbow which is cooled by a flow of a liquid coolant which is directed through passages formed in the exhaust elbow. In certain applications, the coolant passages form a water jacket around the exhaust conduit within the structure of the exhaust elbow. Many different techniques are known to those skilled in the art for managing the flow of coolant through channels associated with the exhaust system.

U.S. Pat. No. 6,290,558, which issued to Erickson on Sep. 18, 2001, discloses an exhaust elbow with a water trap for a marine propulsion system. The exhaust elbow for a marine propulsion exhaust system is provided with a water trap section that defines a water collection cavity. Within the water trap section, a barrier extends downwardly into the water collection cavity to define first and second exhaust passages. When water begins to collect in the water collection cavity, the cross sectional area of the exhaust passage is reduced and the velocity of exhaust gases passing through the exhaust passage is increased. The water collection cavity is shaped to be easily cleared when exhaust gas pressure increases as the engine speed increased.

U.S. Pat. No. 5,980,343, which issued to Rolinski on Nov. 9, 1999, describes an exhaust system for marine vessels. A two pathway exhaust and water discharge through-hull system is coupled to a muffler for separating exhaust gases and cooling water at operating speeds such that at low engine speeds exhaust gases and water are discharged through a first outlet preferable above the waterline and, when the engine speed is increased above a predetermined level, exhaust gases are discharged through a second outlet which communications with a streamlined, low back-pressure underwater discharge skeg and water is discharged through the first outlet.

U.S. Pat. No. 5,421,756, which issued to Hayasaka on Jun. 6, 1995, describes an exhaust system for a marine propulsion machine. An exhaust gas discharge system is provided for a watercraft. The system has a first discharge path, including a first outlet, primarily for use during high speed vessel operation and a second discharge path, including a second outlet, for use during both low and high speed vessel operation. The first outlet is arranged to constantly remain below a water surface level of a body of water within which the watercraft is operated, while the second outlet is arranged to locate above the water level surface during high speed vessel operation and to located below the body of water, at a level higher than the first outlet, during idle and low speed vessel operation.

U.S. Pat. No. 4,831,822, which issued to Yoshimura on May 23, 1989, describes an exhaust system for a marine engine. The exhaust system has an exhaust conduit into which the exhaust gases and engine coolant are discharged. The exhaust conduit has a separator portion that is affected to separate the coolant from the exhaust gases under high speed running conditions so as to achieve maximum power output through a reduction in back pressure but substantially no separation is provided at low speeds so that silencing will not be adversely affected.

The patents described above are hereby expressly incorporated by reference in the description of the present invention.

SUMMARY OF THE INVENTION

An exhaust system for a marine engine, made in conformance with the preferred embodiment of the present invention, comprises an exhaust conduit, a coolant conduit, a coolant inlet port, and an orifice. The exhaust conduit is shaped to be connected in fluid communication with at least one exhaust port of the engine to direct exhaust gases away from the engine. The coolant conduit is disposed in thermal communication with the exhaust conduit. The coolant conduit comprises a first coolant passage and a second coolant passage. A coolant inlet port is disposed in fluid communication with the coolant conduit to direct a flow of coolant into the first and second coolant passages. The orifice is disposed in fluid communication between the coolant inlet port and the second coolant passage. The shape of the orifice is not limiting to the present invention. Its function is to provide a flow of liquid coolant from the coolant inlet port to the second coolant passage and provide a resistance to the flow of coolant through the orifice which changes as a function of the flow of coolant through the coolant inlet port.

The orifice and the first and second coolant passages define a first coolant path from the coolant inlet port through the first coolant passage into the second coolant passage. They also define a second coolant path from the coolant inlet port through the orifice into the second coolant passage. The orifice is shaped to provide increased resistance to flow of the coolant through the orifice as a function of increased flow of coolant through the coolant inlet port. The relative flow rates of coolant through the first and second coolant passages is determined as a function of the flow rate of coolant through the coolant inlet passage.

A drain opening is disposed in fluid communication between the coolant conduit and the exhaust conduit. A coolant outlet port is connected in fluid communication with the coolant conduit for conducting the coolant away from the coolant conduit. The coolant outlet port is disposed in fluid communication between the exhaust conduit and the coolant conduit to conduct the coolant into a stream of the exhaust gases. The exhaust conduit and the coolant conduit are disposed within an exhaust elbow of the exhaust system. The coolant conduit is a coolant conducting jacket, in a preferred embodiment of the present invention, which surrounds the exhaust conduit.

BRIEF DESCRIPTION OF THE DRAWINGS

The present invention will be more fully and completely understood from a reading of the description of the preferred embodiment of the present invention in conjunction with the drawings, in which:

FIG. 4 is a side view of an exhaust elbow with dashed lines representing internal walls;

FIGS. 5 and 6 are two section views taken through portions of FIG. 4;

DESCRIPTION OF THE PREFERRED EMBODIMENT

Figure 1:
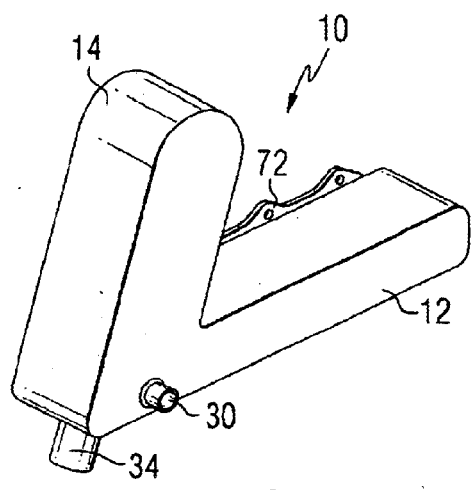
FIGS. 1 and 2 are two isometric representations of an exhaust manifold and elbow made in accordance with the present invention.

Throughout the description of the preferred embodiment of the present invention, like components will be identified by like reference numerals.

Figure 2:
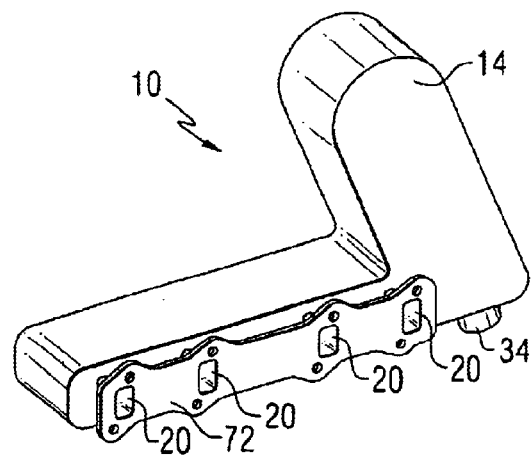

FIGS. 1 and 2 show two different isometric views of an exhaust elbow made in accordance with the present invention. The exhaust elbow 10 comprises a generally horizontal portion 12 and a vertical riser portion 14. An exhaust conduit within the exhaust elbow 10, which will be described in greater detail below, comprises exhaust inlet 20 that direct a flow of exhaust gases from exhaust ports of the engine and into the exhaust conduit within the elbow 10. A coolant inlet port 30 allows liquid coolant to be introduced into a coolant conduit within the exhaust elbow, which will be described in greater below. An exhaust outlet 34 provides a path through which exhaust gases and liquid coolant can be directed away from the exhaust elbow 10.

Figure 3:
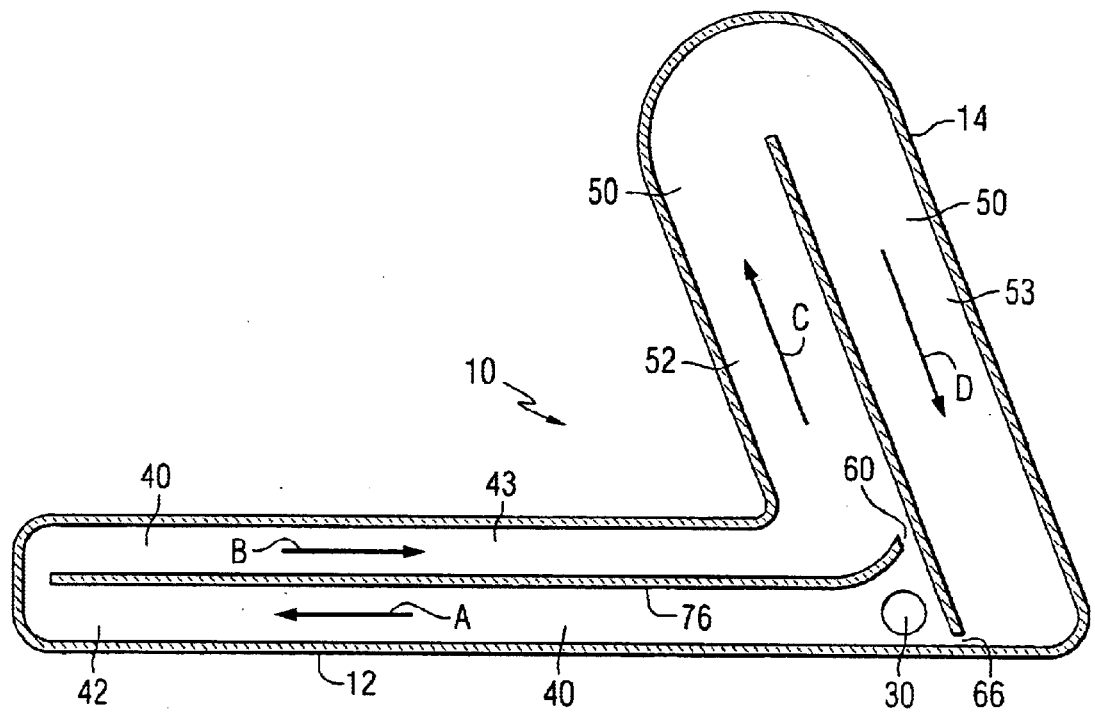
FIG. 3 is a section view of an exhaust elbow showing the various coolant paths and passages of the present invention.

FIG. 3 is a section of the exhaust elbow 10 provided to illustrate a liquid coolant path through the water jacket of the elbow 10. The water jacket is formed around the exhaust conduit so that water can be directed to flow in thermal communication with the exhaust gases and with the exhaust conduit. The management of the water flow is significantly improved by the operation of the present invention.

With continued reference to FIG. 3, water is introduced through the coolant inlet port 30. The coolant conduit illustrated in FIG. 3 comprises a first coolant passage through the horizontal portion 12. The first coolant passage 40 comprises a lower path 42 and an upper path 43 which are arranged in serial association with each other. In other words, water flowing through the lower path 42 sequentially moves into the upper path 43. Both parallel paths within the horizontal portion 12 from the first coolant passage 40. Similarly, a second coolant passage 50 comprises two parallel paths, 52 and 53.

A portion of the water entering through the coolant inlet port 30 moves horizontally, as represented by arrow A, through the lower path 42 and then in the direction represented by arrow B through the upper path 43. That liquid coolant then flows upwardly through path 52 of the vertical riser 14 as represented by arrow C. When the coolant reaches the top of the vertical riser 14, it proceeds downward, as represented by arrow D, to be directed out of the exhaust outlet 34 as described above. That exit path will be described in greater detail below.

With continued reference to FIG. 3, it is important to note that water flowing into the coolant conduit through the coolant inlet port 30 can travel along either of two parallel paths. One path is in a vertical direction through an orifice 60 that provides direct fluid communication between the coolant inlet port 30 and the second coolant passage 50 in the vertical riser 14. This liquid coolant passing through the orifice 60 would immediately continue upwardly through path 52 as represented by arrow C and then downwardly as represented by arrow D.

A portion of the water flowing through the coolant inlet port 30 can also move horizontally, as described above, as represented by arrows A and B before joining the other portion of the coolant as it flows upwardly in the direction shown by arrow C. These two parallel paths are important to the advantageous operation of the present invention because the flow rate of liquid coolant passing through the coolant inlet port 30 determines the ratio of liquid coolant flowing along arrow A with respect to the quantity of liquid coolant flowing through the orifice 60 and upwardly along arrow C. When the flow rate of liquid coolant through the coolant inlet port 30 is relatively low, as when a marine vessel is operating at idle speed, a significant portion of the liquid coolant flows upwardly through the orifice 60 and bypasses the horizontal portion 12 and its paths which are represented by arrows A and B. As the flow rate of water increases through the coolant inlet port 30, the orifice 60 provides increasing resistance to flow through the orifice. As a result, increased coolant flow proceeds along the path identified by arrows A and B in FIG. 3 and a decreased percentage of the total flow proceeds through the orifice 60.

With further reference to FIG. 3, it should be understood that at low engine speeds, it is desirable to allow the horizontal portion 12 of the exhaust elbow 10 to achieve higher temperatures than it could achieve with an essentially full flow of liquid coolant through the horizontal portion 12. By providing the orifice 60, a significant portion of the coolant flow bypasses the horizontal portion 12. As a result, the horizontal portion 12 is allowed to increase in temperature in order to avoid the conditions that can occur when a portion of the exhaust elbow 10 is allowed to operate at temperatures below certain predetermined magnitudes. This can result in deleterious condensation of moisture.

With continued reference to FIG. 3, a drain passage 66 allows water to flow out of the passages shown in FIG. 3 when the engine is turned off. This prevents the accumulation of coolant within the coolant conduit when the engine is not operating. FIG. 3 does not precisely show the continued path of coolant after it passes through the drain opening 66, but that path will be described in greater detail below.

FIG. 4 shows the exhaust elbow 10 of the present invention with dashed lines used to represent internal surfaces that define the exhaust conduit and the coolant conduit. Exhaust gas passes through the exhaust openings 20 to flow into the exhaust conduit within the elbow 10. Liquid coolant, such as water, passes through the coolant inlet port 30 to enter the water jacket that is the coolant conduit surrounding a large portion of the exhaust conduit. Other reference numerals in FIG. 4 are used to identify corresponding components described above in conjunction with FIGS. 1–3.

FIG. 5 is a section view of FIG. 4. It shows the relative positions of the exhaust conduit 70 within the horizontal portion 12 in conjunction with the exhaust inlet opening 20 of the attachment bracket 72 which is used to hold the four exhaust inlets 20 in position relative to exhaust ports of the engine. The upper path 43 and the lower path 42 of the first coolant passage 40 are also illustrated in the positions that dispose them in thermal communication around the exhaust conduit 70. Also shown in FIG. 5 is a rib 76 that separates the upper and lower coolant paths, 43 and 42, from each other.

FIG. 6 is a section view of FIG. 4, as shown. Although the angled position of the vertical riser 14 provides a slightly distorted section view in FIG. 6, the coolant inlet port 30 and exhaust inlet 20 can be seen. Also, both the first coolant passage 40 in the horizontal portion 12 and the second coolant passage 50 in the vertical riser are identified.

Figure 7:
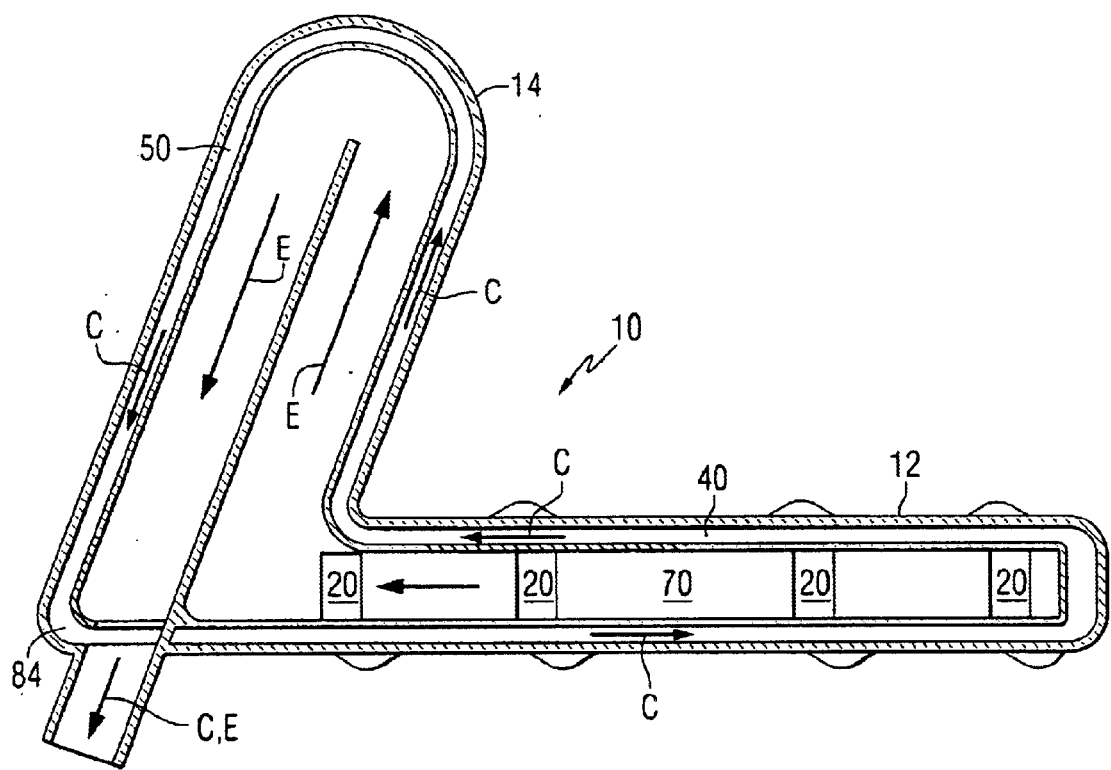
FIG. 7 is a section view of an exhaust elbow showing the relative positions of exhaust and coolant conduits.

FIG. 7 is a, section view taken through the exhaust elbow 10 for the purpose of showing the relative positions of the exhaust conduit 70 and coolant conduit which comprises the first coolant passage 40 and the second coolant passage 50. In FIG. 7 it can be seen that the first and second coolant passages, 40 and 50, of the coolant conduit are disposed around the exhaust conduit 70 so that the liquid coolant flowing through the coolant conduit can remove heat from the exhaust gases and from the exhaust conduit 70. In FIG. 7, the location where the liquid coolant and the exhaust gases are mixed together can be seen. As the exhaust gases pass downwardly through opening 80, the liquid coolant passes through the region identified by reference numeral 84. At this point, they mix together and are conducted away from the exhaust elbow 10 through the exhaust outlet 34. The coolant flow identified by arrows C and the exhaust flow identified by arrows E combine together to flow through the exhaust outlet 34.

Figure 8:
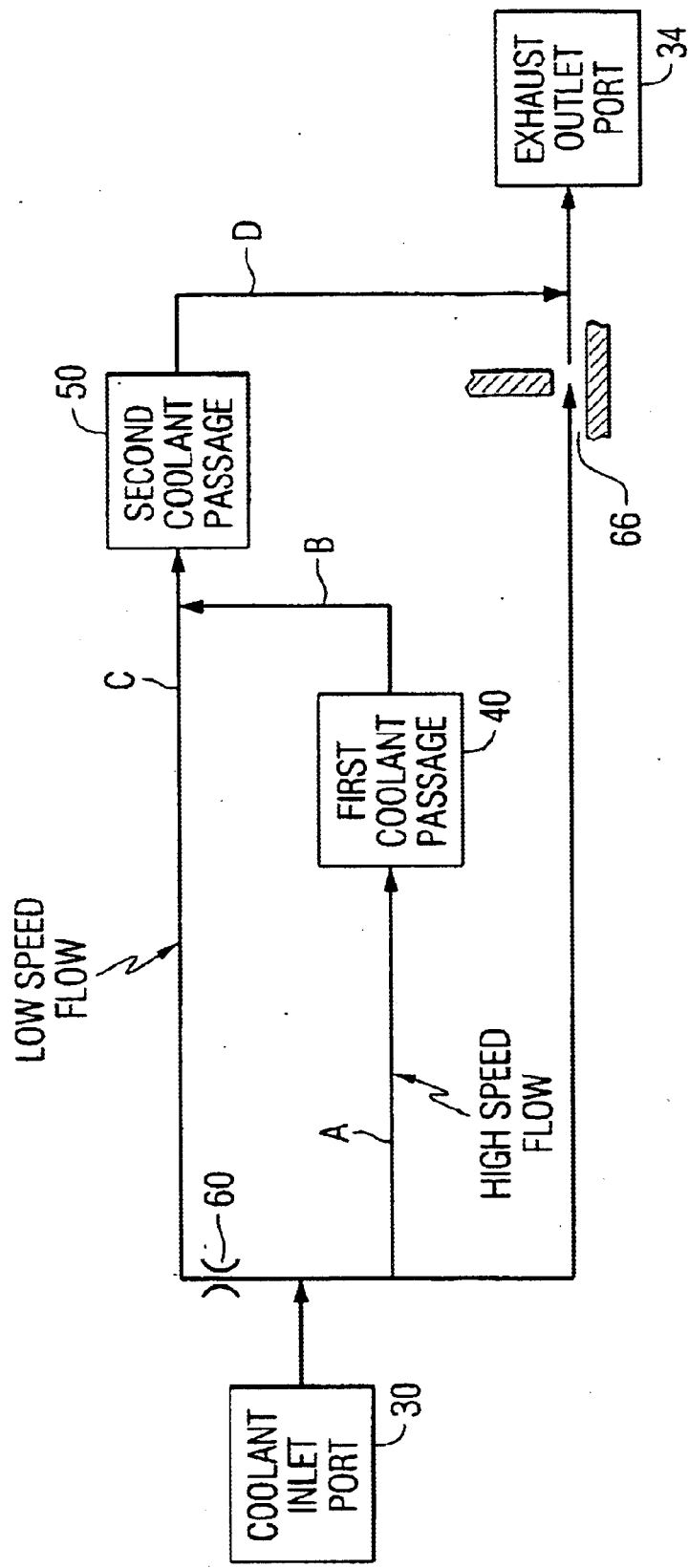
FIG. 8 is a schematic representation showing the parallel paths of coolant provided by the present invention.

FIG. 8 is a schematic representation of the water distribution paths of the coolant conduit made in accordance with the present invention. It should be s understood that the present invention provides two parallel coolant flows which change in magnitude relative to each other as a function of engine speed. With reference to FIGS. 3 and 8, the arrows A and B in FIG. 3 represent the flow through the first coolant passage 40. The remaining flow of coolant, which passes through the orifice 60, is represented by arrows C and D in FIGS. 3 and 8. The drain 66 is also illustrated for purposes of reference to FIG. 3. In FIG. 8, the exhaust outlet port 34 is also illustrated.

With continued reference to FIGS. 3 and 8, the flow of coolant through the exhaust elbow 10 comprises two parallel flows. One of those flows is identified by arrows A and B and the other one of those parallel flows is identified by arrows C and D. At relatively low magnitudes of fluid flow into the coolant inlet port 30, a relatively large portion of the total flow passes through the orifice 60 and continues along arrows C and D through the vertical riser 14. A lesser percentage of the total flow passes along the path identified by arrows A and B through the horizontal portion 12. This results in a relatively slow rate of flow through the horizontal portion 12 which allows the temperature of the horizontal portion 12 to increase so that certain deleterious results, such as condensation, can be avoided. It results in the beneficial operation of the exhaust elbow at elevated temperatures. As engine speed increases, the production of heat increases. As a result, increased coolant flow through the horizontal portion 12 is needed. The orifice 60 operates to provide this change in coolant flow through the horizontal portion 12. The orifice, because of the basic principles described in Bernoulli's equation, increases its resistance to flow through it in response to increased pressure at its inlet relative to the pressure at its outlet. Since the basic principles relating to Bernoulli's equation are well known to those skilled in the art, they will not be described in detail herein. As increased flow passes through the coolant inlet port 30, the resistance provided by the orifice 60 increases to induce a higher percentage of the total flow through the first coolant passage 40, as represented by arrows A and B. Although coolant continues to pass through the orifice 60, the flow rate of coolant through the orifice, with respect to the flow rate through the first coolant passage 40, decreases. After the liquid coolant passes through the first coolant passage 40, it combines with the coolant flowing through the orifice 60, as represented by arrows C and D.

It should be understood that the present invention is primarily directed to distributing the percentages of water flowing through each of the two portions of the parallel system in such a way that the flow through the horizontal portion 12 is reduced, with respect to the flow through the vertical riser 14, at low flow rates through the coolant inlet port when the engine is operating at relatively slow speeds. The operation of the orifice 60 changes the relative distribution of water in the two parallel paths. Increased coolant flow is caused to flow through the first coolant passage 40, with respect to the coolant passing through the orifice 60, when the total coolant flow increases through the coolant inlet port 30 as the engine speed increases.

With reference to FIGS. 1–8, the present invention locates the coolant inlet port 30 at a position within the first coolant passage 40 that is proximate an orifice 60. In certain embodiments, the coolant inlet port 30 can include a component that directs the coolant flow upwardly toward the orifice 60, but this is not required in all embodiments. At relatively low rates of flow through the coolant inlet port 30, a larger percentage of the total flow passes through the orifice 60 then would occur at higher flow rates through the coolant inlet port. The coolant passing through the orifice 60 is allowed to bypass the first coolant passage 40. As a result of the lower flow rate through the first coolant passage 40, the temperature of the horizontal portion 12 is increased to achieve beneficial results.

The operation of the present invention does not require complicated hose connections in an effort to direct the coolant in desired directions. It operates without any moving parts because of the beneficial operation of the orifice 60 to provide a higher resistance to flow at high flow rate then at low flow rates. This change in resistance at the orifice 60 distributes the coolant into the two parallel paths in the beneficial manner described above. The first coolant path, identified by arrows A and B, extends from the coolant inlet port 30 through the first coolant passage 40 and into the second coolant passage 50. The second coolant path, identified by arrows C and D, extends from the coolant inlet port 30 through the orifice 60 and into the second coolant path identified by arrows C and D within the second coolant passage 50.

Although the present invention has been described with particular specificity and illustrated to show a preferred embodiment, it should be understood that alternative embodiments are also within its scope.

We claim:

1. An exhaust system for a marine engine, comprising:

an exhaust conduit shaped to be connected in fluid communication with at least one exhaust port of said engine to direct exhaust gases from said engine;

a coolant conduit disposed in thermal communication with said exhaust conduit, said coolant conduit comprising a first coolant passage and a second coolant passage;

a coolant inlet port disposed in fluid communication with said coolant conduit to direct a flow of coolant into said first and second coolant passages; and an orifice disposed in fluid communication between said coolant inlet port and said second coolant passage, the relative flow rates of coolant through said first and second coolant passages being determined as a function of the flow rate of said coolant through said coolant inlet port.

2. The exhaust system of claim 1, wherein:

said orifice and said first and second coolant passages define a first coolant path from said coolant inlet port through said first coolant passage into said second coolant passage and a second coolant path from said coolant inlet port through said orifice into said second coolant passage.

3. The exhaust system of claim 1, wherein:
said orifice is shaped to provide increased resistance to flow of said coolant through said orifice as a function of increased flow of said coolant through said coolant inlet port.

4. The exhaust system of claim 1, further comprising:
a drain opening disposed in fluid communication between said coolant conduit and said exhaust conduit.

5. The exhaust system of claim 1, further comprising:
a coolant outlet port connected on fluid communication with said coolant conduit for conducting said coolant away from said coolant conduit.

6. The exhaust system of claim 5, wherein:
said coolant outlet port is disposed in fluid communication between said exhaust conduit and said coolant conduit to conduct said coolant into a stream of said exhaust gases.

7. The exhaust system of claim 1, wherein:
said exhaust conduit and said coolant conduit are disposed within an exhaust elbow of said exhaust system.

8. The exhaust system of claim 1, wherein:
said coolant conduit is a coolant conducting jacket which surrounds at least a portion of said exhaust conduit.

9. An exhaust system for a marine engine, comprising:
an exhaust conduit shaped to be connected in fluid communication with at least one exhaust port of said engine to direct exhaust gases from said engine;
a coolant conduit disposed in thermal communication with said exhaust conduit, said coolant conduit comprising a first coolant passage and a second coolant passage;
a coolant inlet port disposed in fluid communication with said coolant conduit to direct a flow of coolant into said first and second coolant passages; and
an orifice disposed in fluid communication between said coolant inlet port and said second coolant passage, said orifice and said first and second coolant passages define a first coolant path from said coolant inlet port through said first coolant passage into said second coolant passage and a second coolant path from said coolant inlet port through said orifice into said second coolant passage, said orifice being shaped to provide increased resistance to flow of said coolant through said orifice as a function of increased flow of said coolant through said coolant inlet port.

10. The exhaust system of claim 9, wherein:
the relative flow rates of coolant through said first and second coolant passages is determined as a function of the flow rate of said coolant through said coolant inlet port.

11. The exhaust system of claim 10, further comprising:
a drain opening disposed in fluid communication between said coolant conduit and said exhaust conduit.

12. The exhaust system of claim 11, further comprising:
a coolant outlet port connected on fluid communication with said coolant conduit for conducting said coolant away from said coolant conduit, said coolant outlet port being disposed in fluid communication between said exhaust conduit and said coolant conduit to conduct said coolant into a stream of said exhaust gases.

13. The exhaust system of claim 12, wherein:
said exhaust conduit and said coolant conduit are disposed within an exhaust elbow of said exhaust system, said coolant conduit being a coolant conducting jacket which surrounds at least a portion of said exhaust conduit.

14. An exhaust elbow for a marine engine, comprising:
a first conduit shaped to be connected in fluid communication with at least one exhaust port of said engine to direct exhaust gases from said engine;
a second conduit disposed in thermal communication with said first conduit, said second conduit comprising a first water passage and a second water passage;
an inlet port disposed in fluid communication with said second conduit to direct a flow of water into said first and second water passages; and
an orifice disposed in fluid communication between said inlet port and said second water passage, said orifice being shaped to provide increased resistance to flow of said water through said orifice as a function of increased flow of said water through said inlet port, the relative flow rates of water through said first and second water passages being determined as a function of the flow rate of said water through said inlet port.

15. The exhaust system of claim 14, wherein:
said orifice and said first and second water passages define a first water path from said inlet port through said first water passage into said second water passage and a second water path from said inlet port through said orifice into said second water passage.

16. The exhaust system of claim 15, further comprising:
a drain opening disposed in fluid communication between said second conduit and said first conduit.

17. The exhaust system of claim 16, further comprising:
a water outlet port connected on fluid communication with said second conduit for conducting said water away from said second conduit, said water outlet port being disposed in fluid communication between said first conduit and said second conduit to conduct said water into a stream of said exhaust gases.

18. The exhaust system of claim 17, wherein:
said second conduit is a water conducting jacket which surrounds at least a portion of said first conduit.

* * * * *